Nov. 25, 1930.       C. A. IVES       1,783,043
AIR BRAKE SYSTEM
Filed May 22, 1929
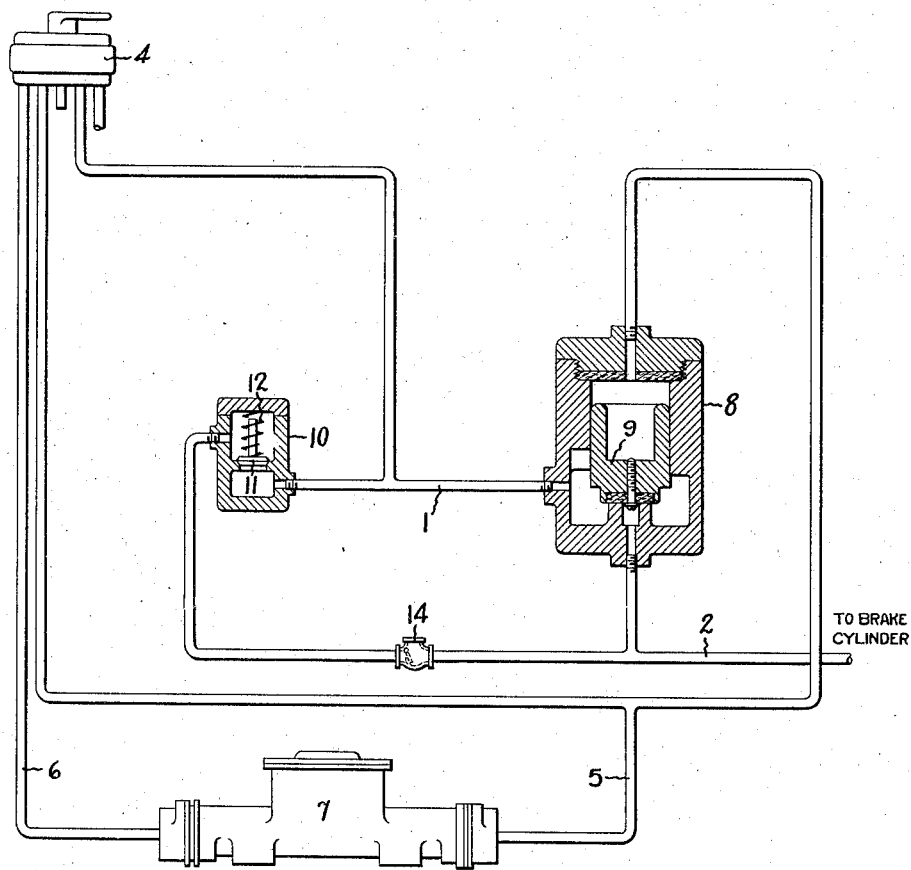
Inventor:
Charles A. Ives,
by Charles E. Mullan
His Attorney.

Patented Nov. 25, 1930

1,783,043

UNITED STATES PATENT OFFICE

CHARLES A. IVES, OF LAWRENCE PARK, PENNSYLVANIA, ASSIGNOR TO GENERAL ELECTRIC COMPANY, A CORPORATION OF NEW YORK

AIR-BRAKE SYSTEM

Application filed May 22, 1929. Serial No. 365,171.

My invention relates to air brake systems and particularly to systems including car door controlling mechanisms such, for example, as a safety car control equipment.

One of the common objections to some of the safety car control equipments now in use is the fact that it is necessary to make two separate and distinct applications of the air brakes whenever the car is stopped and the doors are opened. In making a stop, the motorman first places the brake valve in the brake applied-doors closed position, in which position the main reservoir pipe is connected to the straight air pipe. As the car comes to a stop, the motorman releases the air from the brake cylinder by moving the brake valve to the release position until just enough air is left in the brake cylinder to hold the car. In order to open the doors after the car stops, the motorman then moves the brake valve to the brake applied-door opening position, in which position the main reservoir is connected to both the straight air pipe and the door opening pipe of the door operating mechanism. The brake cylinder, therefore, may be filled to full main reservoir pressure twice during the stop. This is not only objectionable from the viewpoint of the waste of air pressure but also because the release of the brakes is delayed due to the necessity of releasing so much air pressure from the brake cylinder after the doors have been opened.

One object of my invention is to provide an improved arrangement for maintaining the brakes applied when the doors are open, which does not have the above objections.

In accordance with my invention, I provide an arrangement whereby the pressure in the brake cylinder is permitted to build up to the pressure in the straight air pipe when the doors are closed, but is limited to a predetermined value which is sufficient to keep the car from moving when the doors are open.

My invention will be better understood from the following description, when taken in connection with the accompanying drawing and its scope will be pointed out in the appended claims.

In the accompanying drawing, the single figure is a diagrammatic view, partly in section of a safety car equipment embodying my invention, only such portion of the equipment being shown as is deemed necessary for a clear understanding of my invention.

Referring to the drawing, 1 represents the straight air pipe of an air brake system through which air pressure is supplied to and released from a pipe 2, which leads to a brake cylinder (not shown). 4 represents a suitable motorman's brake valve for controlling the air pressure in the straight air pipe 1 and also the supply of air pressure in a door opening pipe 5 and the door closing pipe 6 leading to a door engine 7 of any suitable type, examples of which are well-known in the art. The motorman's valve 4 may be of any suitable type, examples of which are well known in the art, which is arranged so that air pressure can be supplied to and released from the straight air pipe 1 without effecting the operation of the door engine to open the car doors and so that air pressure can be supplied to the straight air pipe at the same time air pressure is supplied to the door opening pipe 5 to effect the operation of the door engine 7 to open the car doors.

In accordance with my invention, I provide two connections between the straight air pipe 1 and the brake cylinder pipe 2, one of these connections including a suitable cut-off valve 8 which is controlled by the pressure in the door opening pipe 5 so that when air pressure is supplied to the pipe 5 to effect the opening of the car doors, communication is cut off through this connection between the straight air pipe 1 and the brake cylinder pipe 2. As shown in the drawing, the cut-off valve 8 includes a casing containing a normally closed valve 9 which is subject on one side to the pressure in the straight air pipe 1 and on the other side to the pressure in the door opening pipe 5. When there is pressure in the door opening pipe 5, the valve 9 is maintained on its seat so that communication between the straight air pipe 1 and the brake cylinder pipe 2 through the valve is cut off. When, however, there is no pressure in the door opening pipe 5 and there is air pressure in the straight air pipe 1, the valve 9 is lifted off of its seat by the straight air pipe pressure so that communication is maintained between the straight air and brake cylinder pipes through the valve 8.

In the other connection between the straight air pipe 1 and the pipe 2 leading to the brake cylinder is a suitable reducing valve 10, examples of which are well known in the art, which is arranged to cut off communication between the straight air and brake cylinder pipes through this connection when the pressure on the brake cylinder side of the valve 10 is above a predetermined value. As shown in the drawing the reducing valve 10 comprises a casing containing a valve 11, one side of which is subject to the pressure in the straight air pipe 1 and the other side of which is subject to the force exerted by a spring 12 and the pressure in the connection leading to the brake cylinder pipe 2. The reducing valve 11 is arranged so that when the air pressure on the spring or low pressure side of the valve is above a predetermined value, the valve 11 is held on its seat thereby preventing the pressure on the low pressure side of the valve 11 from exceeding a predetermined value. In order to prevent full main reservoir pressure from coming against the low pressure side of the reducing valve and also in order to prevent air from being drawn through the reducing valve in the opposite direction from which it normally flows, when the brakes are released, I provide a suitable check valve 14 between the low pressure side of the reducing valve 10 and the brake cylinder pipe 2 which allows air pressure to flow only from the reducing valve 10 to the brake cylinder pipe 2.

The operation of the arrangement shown in the drawing is as follows: When air pressure is supplied to the straight air pipe to effect an ordinary straight air application of the brake, and there is no pressure in the door opening pipe 5, the straight air pipe pressure causes the valve 9 in the cut off valve 8 to move off of its seat, thereby opening communication between the straight air pipe 1 and the pipe 2 leading to the brake cylinder. The pressure in the brake cylinder, therefore, can build up to full main reservoir pressure as in the standard straight air brake equipments.

When, however, air pressure is simultaneously supplied to the door opening pipe 5 to effect the operation of the door controlling mechanism to open the car doors and to the straight air pipe 1 to effect the application of the brakes, the pressure in the door opening pipe 5 maintains the valve 9 in the cut off valve 8 on its seat so that no air pressure flows through the valve 8 to the brake cylinder pipe. The air pressure in the straight air pipe 1, however, causes the reducing valve 10 to allow a sufficient amount of air pressure to be supplied to the brake cylinder pipe 2 through the check valve 14 to hold the car when stopped. As soon as the pressure in the brake cylinder builds up to the desired value, the spring 12 closes the valve 11 in the reducing valve 10, thereby preventing the pressure in the brake cylinder from building up to the full main reservoir pressure when the doors are closed.

While I have, in accordance with the patent statutes shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:—

1. In an air brake system, a straight air pipe, a brake cylinder pipe, door controlling mechanism, and means for permitting the pressure in said brake cylinder pipe to build up to the pressure in said straight air pipe when the doors controlled by said mechanism are closed and for limiting the pressure in said brake cylinder pipe to a predetermined value when said mechanism is operated to open the doors.

2. In an air brake system, a straight air pipe, a door opening pipe, valve means responsive to fluid pressure in said door opening pipe for cutting off communication from said straight air pipe, and means responsive to fluid pressure in said straight air pipe for supplying fluid pressure at a reduced pressure around said valve means.

3. In an air brake system, a straight air pipe, a cut-off valve in said pipe, a door opening pipe, means responsive to fluid pressure in said door opening pipe for effecting the closing of said valve, and a reducing valve controlling a connection around said cut-off valve.

4. In an air brake system, a straight air pipe, a brake cylinder pipe, two connections between said pipes, a reducing valve in one of said connections, a cut-off valve in the other connection between said pipes, door controlling mechanism, and means for effecting the closing of said cut-off valve when the door mechanism is operated to open the doors.

5. In an air brake system, a straight air pipe, a brake cylinder pipe, two connections between said pipes, a reducing valve in one of said connections for cutting off communication therethrough when the pressure in said brake cylinder pipe is above a predetermined value, door controlling mechanism, and means for cutting off communication through the other of said connections when said door mechanism is operated to open the doors.

6. In an air brake system, a straight air pipe, a brake cylinder pipe, two connections between said pipes, a reducing valve in one of said connections for cutting off communication therethrough when the pressure in said brake cylinder pipe is above a predetermined value, a check valve connected in said one of said connections between said reducing valve and said brake pipe for preventing fluid pressure from flowing from said brake cylinder pipe to said reducing valve, door controlling mechanism, and means for cutting off communication through the other of said connections when said mechanism is operated to open the doors.

In witness whereof, I have hereunto set my hand this 20th day of May, 1929.

CHARLES A. IVES.